United States Patent Office 3,418,570
Patented Dec. 24, 1968

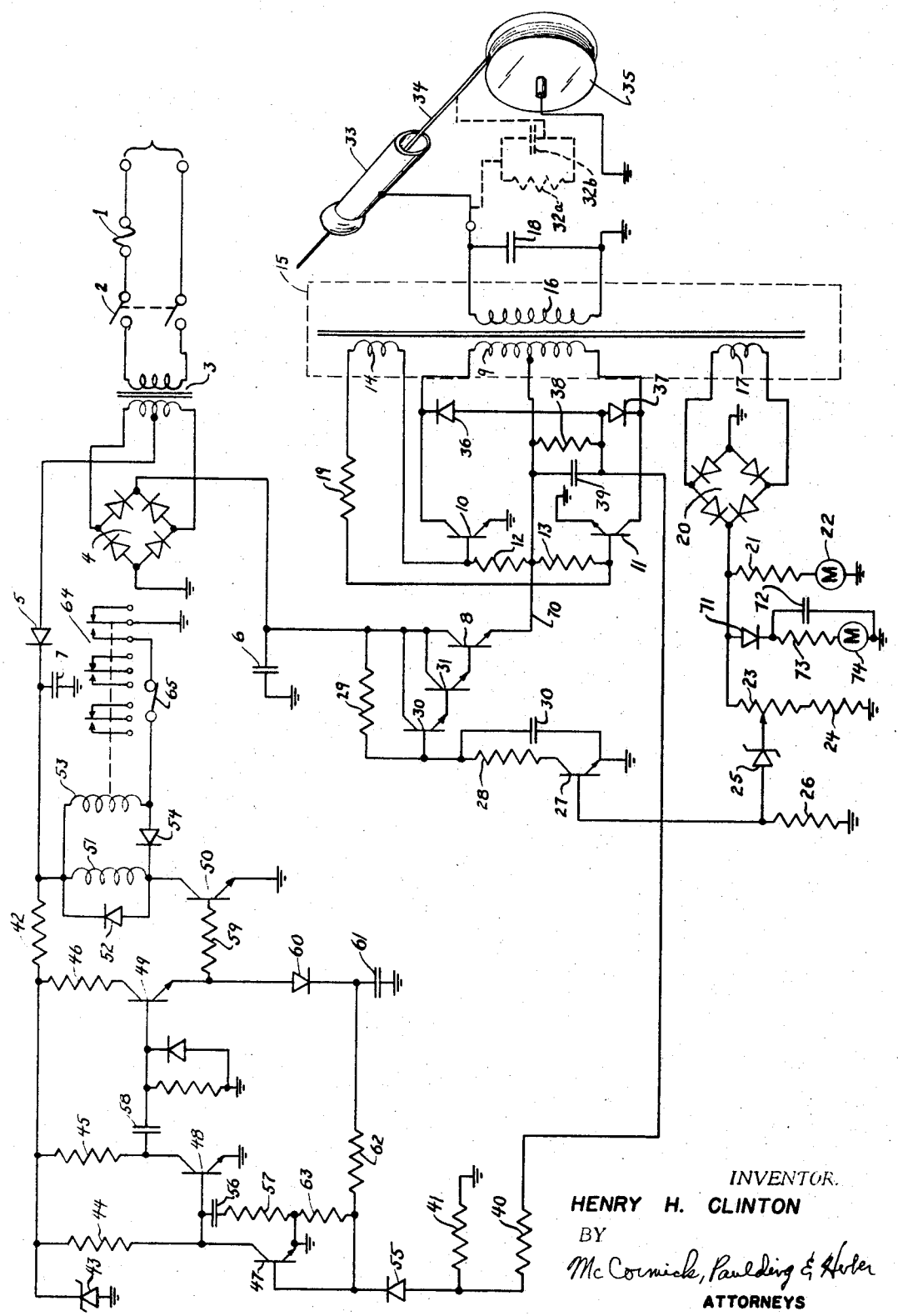

3,418,570
ELECTRICAL DEVICE FOR TESTING FOR AND COUNTING FLAWS IN THE INSULATION OF AN ELECTRICAL CONDUCTOR PASSING THROUGH AN ELECTRODE
Henry H. Clinton, Ridgewood, Clinton, Conn. 06413
Filed Aug. 26, 1966, Ser. No. 575,315
14 Claims. (Cl. 324—54)

ABSTRACT OF THE DISCLOSURE

A device for testing for and counting flaws in the insulation of an electrical conductor passed in a continuous fashion through an electrode includes a high frequency oscillator coupled with the electrode through a step-up transformer for producing a high voltage applied across the insulation. A regulating circuit varies the current supplied to the oscillator in accordance with the load impedance to maintain the test voltage at a relatively constant value when no flaws appear at the electrode. A fault counting or detecting circuit is also controlled by a load impedance related signal so as to register a fault when such signal falls from a normal value to a low value indicative of a fault, and a time delay in such circuit prevents the registration of another fault for a given period thereafter.

---

This invention relates to devices for fault testing the insulation applied to a cable, wire or other elongated electrical conductor, and deals more particularly with insulation testing apparatus of the type wherein a high test voltage is applied between the insulation and the conductor to reveal holes, voids or other imperfections in the insulation.

Insulated electrical conductors, such as wire or cable, are usually subjected to a high voltage test prior to use as a check against any unseen imperfections which may be present in the insulation. This test may be made either as the insulation is extruded onto the conductor or may be performed in some subsequent operation. The insulated conductor, which is suitably grounded, is passed through an electrode of some kind which applies a high voltage to the outer surface of the insulation. In some prior art devices the test voltage is an alternating voltage, and in other prior art devices direct or unidirectional test voltages are used. In either case, the test voltage produces a spark or arc upon the appearance of an imperfection at the electrode, and usually the testing apparatus includes a counter, alarm and/or other indicator or control which is operated in response to the appearance of such an arc.

In prior testing devices utilizing alternating test voltages the frequency of the voltage is commonly 60 Hz. As the insulated conductor moves through the test electrode the instantaneous value of the test voltage varies with time, and to insure that the maximum instantaneous value of the test voltage is applied to each point of the conductor it is necessary for each point on the conductor to be within the electrode for at least one $\frac{1}{120}$ of a second. This places a limitation on the speed at which the conductor may be moved through the electrode and/or on the electrode length. Additionally, the alternating voltage testing devices previously proposed usually are dependent on the arc current to close a relay for actuating the associated counter, alarm or the like. Such a relay requires a finite amount of power to operate and may take several cycles of arc current before fully closing, depending on the amplitude of the test voltage and the strength of the arc. Therefore, in some cases arcs may occur without actuating the associated relay and may thus remain undetected. To reduce this possibility most electrodes of present alternating voltage testers are now made of such length, in relation to the speed of the conductor therethrough, that each point on the conductor is in the electrode for many times more than the theoretical minimum $\frac{1}{120}$ second value. Also, the current which is required to operate the associated relay is of such a high value that when an arc does occur it often damages the defective insulation so as to make it difficult to visually determine the cause of the initial defect. Increasing the length of the electrode, however, has the disadvantage that a single fault may be counted many times as it passes through a long electrode.

Testing devices utilizing unidirectional test voltages overcome some of the disadvantages, discussed above, of devices using alternating test voltages. However, the corona generated by a unidirectional test voltage is not as great as that produced by an alternating test voltage. The corona produced by an alternating test voltage creates a conductive ionized sheath surrounding the insulated conductor which, it is generally believed, is more effective, in comparison to the corona produced by a unidirectional test voltage, in searching out flaws which are not intimately in contact with the test electrode. For this reason alternating voltage test devices are often preferred to unidirectional voltage testing devices despite the other disadvantages of the alternating voltage devices.

The general object of this invention therefore is to provide an insulation testing device which overcomes the disadvantages present in previous alternating voltage test devices while nevertheless retaining the advantage of the large corona produced by an alternating voltage.

Another object of this invention is to produce an insulation testing device having a relatively high permissible conductor speed to electrode length ratio thereby allowing the conductor to be moved at a high rate to speed up the inspection process and allowing the electrode to be made of a relatively short length so as to occupy only a short space in the path along which the conductor is moved.

Another object of this invention is to provide an insulation testing device having a reliable, high speed fault detection system, such system requiring a very low arc current which minimizes damage to the insulation adjacent a fault and which presents no safety hazard.

Another object of this invention is to provide an insulation testing device of the foregoing character wherein the conductor is exposed to the corona for only a very short time, wherein the conductor need not be grounded in all cases, which device leaves no residual charge on the insulation as a result of the test, and which device is easily calibrated by conventional means.

A further object of this invention is to provide an insulation testing device utilizing an alternating test voltage which includes a circuit for preventing the same fault from being counted twice and which circuit has a fast recovery after the detection of a fault to assure the detection of subsequent faults.

Other objects and advantages of the invention will be apparent from the following description and from the drawing forming a part hereof.

The drawing shows a preferred embodiment of the invention and such embodiment will be described, but it will be understood that various changes may be made from the construction disclosed and that the drawing and description are not to be construed as defining or limiting the scope of the invention, the claims forming a part of this specification being relied upon for that purpose.

The single figure of the drawing is, except for a simplified perspective showing of a conductor take-up reel and an electrode, a wiring diagram of an insulation tester embodying this invention.

Before turning to the drawing, it may be noted that the insulation testing device of this invention uses a test voltage having a high frequency sinusoidal waveform. The actual frequency employed may vary widely, but the frequency presently preferred is at least 600 Hz. and, more preferably, is on the order of approximately 3000 Hz. With a frequency of 3000 Hz. the maximum instantaneous applied test voltage is repeated at a rate of 6000 times per second to produce a 50-fold improvement in the conductor speed to electrode length ratio as compared to testing devices utilizing 60 Hz. waveforms. The high frequency test voltage is produced by an oscillator the frequency of which is determined by a resonant circuit including the inductance of an output transformer and the impedance between the test electrode and the conductor under test, and a means is included in the oscillator for maintaining the output power relatively constant despite changes in this impedance and other parameters. By the use of this means the arc current may be kept quite low to minimize damage to the insulation. Also, a fault detection means is utilized wherein a signal resulting from an arc produced by a fault is used to trigger another circuit which operates an electrical counter, relay or the like and which includes a time delay during which further signals, as might be produced by the same fault, are prevented from operating the counter, relay or the like.

Turning now to the drawing, the testing device there illustrated is intended for use with an insulated electrical conductor 34 which is moved through a test electrode 33 as by being wound on a take-up reel 35. The conductor 34 may be taken from an insulation extruding machine, a supply reel or other similar source, not shown. The actual conducting portion of the conductor, as shown, is grounded through the take-up reel 35. Due to the use of a high frequency test voltage, however, this grounding of the conductor is not always necessary and may often be omitted when testing relatively large reels of conductor. The test electrode 33 may take various different forms and, for example, may be a generally conventional bead chain or flared mouth electrode. The length of this electrode may vary, but it is preferably aproximately two inches long. With a two inch length, the electrode may be used to detect faults on a conductor moving therethrough at a rate of 15,000 feet per minute with four voltage maxima being applied to every point on the wire, assuming a 3,000 Hz. voltage waveform. Assuming that at least four voltage maxima applied to every point on the wire are required to make a successful test and with the conductor moving at 15,000 feet per minute through the two inch long electrode the time during which each part of the conductor is exposed to the corona is on the order of a few milliseconds. Preferably, however, a larger number of voltage maxima are applied to each point of the conductor, as by slowing its rate of travel through the electrode. In the drawing the broken line showing of a resistor 32a represents the electrical resistance of the insulation on the conductor and the broken line representation of a capacitor 32b represents the distributed capacitance of the conductor.

In the illustrated embodiment of the invention the various parts of the testing device are basically electrical circuit components which are arranged and interconnected as shown. The device is adapted to be powered by a standard 60 Hz. power source through a fuse 1, a switch 2 and a step-down transformer 3. The secondary winding of the step-down transformer 3 is connected to a full-wave bridge rectifier 4 and to a half-wave rectifier 5. The rectified positive pulses of these two rectifiers are filtered respectively by capacitors 6 and 7 so as to supply direct or unidirectional potentials for powering the various associated circuits.

The oscillator for producing a high frequency test voltage has a power input line 70 connected with the capacitor 6 through a transistor 8. The oscillator itself includes two transistors 10 and 11 and various coils of an output transformer 15. The output or secondary winding 16 of the transformer 15 is connected in parallel with a capacitor 18 with one terminal of the parallel circuit so formed being grounded and the other terminal being connected to the test electrode 33. In the operation of the oscillator, direct current flows from the capacitor 6, through the transistor 8, through one or the other halves of the transformer primary winding 9 and through the collector of one or the other of the transistors 10 and 11 to ground. The bases of the transistors 10 and 11 are biased through resistors 12 and 13, respectively. Additionally, the transformer 15 includes a feedback winding 14, connected with the bases of the transistors 10 and 11, which produces a feedback voltage and current signal such as to cause sine wave oscillations to build-up, with the transistors 10 and 11 alternately conducting for a small portion of each cycle, the circuit behavior being generally similar to that of a conventional class C oscillator. The resistor 19 in series with the feedback winding 14 limits the feedback current to the bases of the transistors 10 and 11.

A regulating circuit is coupled with the transformer 15 and controls the bias of the transistor 8 to vary the current applied to the oscillator through the transistor 8 and to thereby control the output voltage. This regulating circuit includes a metering winding 17 on the transformer 15. A voltage related to the output voltage is induced in the winding 17 and is converted to positive pulses by a full-wave bridge rectifier 20. A meter 22 is connected between the output terminal of the bridge 20 and ground through a resistor 21 and is of the type adapted to indicate the average or RMS voltage thereacross. If desired, a second meter 74 can be actuated through the peak detector consisting of diode 71, capacitor 72 and resistor 73 to indicate the crest value of the voltage waveform. Preferably, either meter is so calibrated as to indicate the output voltage across the secondary winding 16 to which the voltage appearing across the winding 17 is directly related when no fault is present on the conductor in the electrode. The rectified output of the rectifier 20 also is applied across a resistive network comprising resistors 23 and 24, the resistor 24 being a fixed resistor and the resistor 23 being the resistor of a potentiometer having its wiper connected to a Zener diode 25. The opposite side of the Zener diode 25 is connected to ground through the resistor 26 and is also connected to the base of a transistor 27. The voltage appearing on the wiper of the potentiometer 23 is accordingly compared with the Zener voltage of the Zener diode 25 and the difference is applied to the base of the transistor 27. This difference voltage in turn causes base current to flow in the transistor 27 and produces an amplified current through resistors 28 and 29 in the collector circuit of transistor 27. The voltage drop across the resistor 29 represents the peak value of the collector current of the transistor 27 because of the filtering action of a capacitor 30 which is connected between the emitter of the transistor 27 and the junction between the two resistors 28 and 29. This voltage controls the potential appearing at the emitter of transistor 8 by acting through two other transistors 30 and 31 connected as emitter followers.

From the foregoing it will therefore be understood that when the amplitude of the voltage waveform at the metering winding 17 increases for any reason the action of the elements connected between the metering winding and the transistor 8 is such as to reduce the conductivity of the transistor 8 and to thereby decrease the power. Similarly, if the amplitude of the waveform of the metering winding is decreased the conductivity of the transistor 8 is increased to increase the output power. A closed loop control is therefore obtained and the output voltage is regulated at a relatively constant value despite changes in power line voltage, temperature and load impedance. If the load impedance remains relatively constant the control will therefore operate to maintain the output or test voltage at a relatively constant value. If the load impedance drops drastically as the result of a flaw in the insulation, the output voltage disappears, since the oscillator ceases to function.

When a fault in the insulation of the conductor 34 appears at the electrode 35 the load impedance is drastically decreased. The fault detecting means of this invention in turn includes a first circuit for producing a voltage signal in response to such a sudden decrease in the load impedance, and a second circuit responsive to such voltage signal for actuating the associated counter, alarm or the like. In the illustrated example the circuit for producing a voltage signal in response to a decrease in the load impedance includes two diodes 36 and 37 which rectify the negative peaks of the voltages appearing at the collectors of the transistors 10 and 11, and a resistor 38 and a capacitor 39 which form a negative peak detector. Under normal operating conditions the capacitor 39 is charged so that the potential of the side thereof connected with the emitter of the transistor 8 is the same as that of said emitter and so that the potential of the junction between the two diodes 36 and 37, the resistor 38 and the capacitor 39 is close to ground potential. In the event of an arc, however, the load resistance, 32a, decreases, in turn decreasing the effective resistance of the winding 9 and causing the voltage at the aforementioned junction to rise abruptly to a large value. This voltage rise is transmitted to the second circuit through the diode 55 and is attenuated by the resistors 40 and 41.

The second circuit of the fault detection means, to which the voltage signal is applied through the diode 55, includes a counter energized by a coil 51 and a relay energized by a coil 53, the relay having associated therewith a number of contacts which may be used for controlling the energization of an associated alarm or other circuit or circuits. One set of these contacts, indicated at 64, is used as part of a holding circuit for the relay coil. In the operation of the second circuit a positive supply voltage is furnished to the collectors of the transistors 47, 48 and 49 by the rectifier 5 through a dropping resistor 42, a regulating Zener diode 43 and collector load resistors 44, 45 and 46, respectively. These transistors are so biased that the transistors 47 and 49 are normally cut off and the transistor 48 normally conducting. These three transistors control a fourth power transistor 50 which is also normally cut off and which controls the energization of the counter coil 51 and the relay coil 53. The diode 54 is connected between the relay coil 53 and the collector of the transistor 50 and a protective diode 52 is connected across the counter coil 51.

When a fault occurs in the conductor under test the positive voltage which appears at the diode 55, as previously described, turns on the transistor 47. This in turn cuts off the transistor 48 as the capacitor 56 discharges through the resistor 57 and the collector-emitter circuit of the transistor 47. With the turning off of the transistor 48, its collector starts to rise toward the positive supply voltage as the capacitor 58 charges through the base-emitter circuits of the transistor 49 and the transistor 50, thereby causing the transistors 49 and 50 to conduct. As the emitter of the transistor 49 becomes positive, due to the voltage drop across the resistor 59, the capacitor 61 charges through the diode 60. This positive potential is applied back to the base of the transistor 47 through the resistor network made up of the resistors 62 and 63 and causes the transistor 47 to be turned on more fully.

During the time the capacitor 58 is charging, the transistor 50 is in a conducting state and the coil 51 of the counter is energized, thereby operating the counter. The coil 53 of the relay is also energized at the same time and switches the associated contacts to operate the associated alarm or the like. Included in the contacts are the contacts indicated at 64 which are closed and which when closed complete a holding circuit through the manually operated reset switch 65.

When the capacitor 58 reaches the end of its charging period, the flow of current through the base terminals of the transistors 49 and 50 is terminated and these transistors therefore stop conducting and allow the counter coil 51 to become de-energized. The capacitor 61, however, now discharges and maintains the base of the transistor 47 positive, thereby holding the transistor itself in a conducting state, whether or not the fault signal from the diode 55 is present. The normally open relay contacts 64 which are closed during conduction of the transistor 50 maintains current flow through the relay coil 53 and prevents it from de-energizing until the normlaly closed reset sfitch 65 is opened manually.

After the running of the delay period provdied by the discharge of the capacitor 61, the transistor 47 turns off, provided no fault signal is present at the diode 55 at the time the capacitor 61 reaches its discharged condition. After the transistor 47 is turned off the capacitor 56 charges through the resistors 44 and 57 and at the end of a one or two millisecond delay, provided by the charging of the capacitor 56, the transistor 48 is returned to its conducting state, thereby allowing the capacitor 58 to discharge rapidly through the diode 66 and resistor 67.

The action of the fault detecting circuit may be summarized as follows. If an arc starts at one end of the test electrode it will travel toward the other end of the electrode as a result of the movement of the conductor therethrough. Throughout this occurrence of the arc it may exhibit occasional interruptions, of about one millisecond duration, which in turn produce interruptions of similar duration in the fault signal appearing at the diode 55. At the initial appearance of the fault signal the transistor 47 is turned on and the tarnsistor 48 off. Interruptions which immediately follow the initiatoin of the fault signal may momentarily turn off the transistor 47, but they do not cut off the transistor 48 because of the action of the capacitor 56 which holds the transistor 48 on despite such interruptions. Thereafter, after the capacitor 61 is charged, the capacitor 61 holds the transistor 47 on so that interruptions in the fault signal will not affect the transistor 47. Therefore, after the initiation of a fault signal it is continuous from the transistor 48 on through the rest of the circuit and a single fault is registered by the counter 51 despite the fact that interruptions may occur in such signal.

If the total duration of the fault signal is less than the delay period provided by the capacitor 61 and resistor 62, the counter will not respond to subsequent fault signals which occur during this delay period plus the additional delay period of about two milliseconds provided by the charge time of the circuit including the capacitor 56 and resistors 44 and 57. If the total duration of the fault signal is greater than the discharge time of the capacitor 61 and resistor 62, the counter will respond to a second fault signal after the elapse of the charging time of the circuit comprised of the capacitor 56 and the resistors 44 and 57. The fault detecting circuit therefore achieves an extremely fast recovery after the detection of a fault while nevertheless preventing the same fault from being counted twice. As mentioned previously, the speed of the conductor 34 through the electrode 33 is preferably so related to the length of the electrode and the frequency of the applied test voltage that a number of cycles of the test voltage are applied to each point of the conductor as it passes through the electrode. Therefore, the delay period provided by the capacitor 61 and resistor 62 is preferably approximately equal to or slightly greater than the amount of time required for a single point on the conductor to pass through the electrode, and this in turn is equal to the amount of time required for the applied voltage to undergo a number of cycles.

In the testing device described above all of the circuit elements are solid state devices which allows the device to be made as a relatively compact unit. It will be obvious, however, that if desried various ones of the transistors and/or diodes may be replaced by vacuum tubes, and for this reason in the claims which follow the term "current flow control device" has been used to refer to either a transistor or vacuum tube.

The invention claimed is:

1. A device for testing the insulation on an insulated conductor and for use with an electrode through which the conductor is passed with a continuous motion and adapted to apply a high test voltage to the portion of such insulation instantaneously received therein, said device comprising an oscillator for producing a high frequency alternating test voltage for transmission to an electrode such as aforesaid, means associated with said oscillator for producing a signal related to the load impedance to which said test voltage is applied, said load impedance including the insulation of the insulated conductor as a portion thereof, a fault indicating means including a coil, and a circuit for switching said coil between an energized state and a deenergized state in response to said load impedance related signal, said circuit including means for maintaining said coil in one of said states of energization when said load impedance related signal is greater than a predetermined value and for switching said coil to said other state of energization when said load impedance related signal falls below said predetermined value in response to a change in the impedance of said conductor insulation due to a fault therein.

2. A device as defined in claim 1 further characterized by said circuit for switching said coil between an energized state and a de-energized state in response to said load impedance related signal further including a time delay means for maintaining said coil in its second state of energization throughout a given delay period following the fall of said load impedance related signal below said predetermined value and despite the subsequent rise of said signal above said predetermined value during said delay period.

3. A device as defined in claim 2 further characterized by said oscillator having an output frequency falling within the range of 600 Hz. to approximately 3000 Hz. and said delay period being equal to the time required for a number of cycles of said test voltage.

4. A device as defined in claim 2 further characterized by said oscillator having an output frequency of approximately 3000 Hz. and said delay period being equal to the time required for a number of cycles of said test voltage.

5. A device as defined in claim 1 further characterized by said oscillator including a transformer having a primary winding through which primary current flows and a secondary winding adapted for connection with an electrode such as aforesaid and in which said high test voltage is induced by said primary current, and said means for producing a signal related to the load impedance including an impedance detecting circuit connected across two points of said primary winding.

6. A device as defined in claim 5 further characterized by said impedance detecting circuit including a resistor and capacitor connected in parallel with each other and in series with a diode, the load impedance related signal appearing at the junction of said capacitor and resistor with said diode.

7. A device for testing the insulation on an insulated conductor and for use with an electrode through which the conductor is passed with a continuous motion and adapted to apply a high test voltage to the portion of such insulation instantaneously received therein, said device comprising an oscillator for producing a high frequency alternating test voltage for transmission to an electrode such as aforesaid, said oscillator including a current input line and also including a transformer having a secondary winding in which said high frequency test voltage is induced and a metering winding in which a control voltage is induced, a current flow control device in said current input line for controlling the flow of current therethrough, means coupled to said metering winding for rectifying said control voltage, and means for controlling the state of conduction of said current flow control device in response to changes in the peak value of the rectified voltage produced by said rectifying means caused by changes in the impedance of the insulation under test.

8. A device as defined in claim 7 further characterized by a fault indicating means including a coil, and a circuit for switching said coil between an energized state and a de-energized state in response to said load impedance related signal, said circuit including means for maintaining said coil in one of said states of energization when said load impedance related signal is greater than a predetermined value and for switching said coil to said other state of energization when said load impedance related signal falls below said predetermined value.

9. A device as defined in claim 8 further characterized by said means for producing a signal related to the load impedance including an impedance detecting circuit connected across two points of said primary winding.

10. A device for testing the insulation on an insulated conductor and for use with an electrode adapted to apply a high test voltage to such insulation therein, said device comprising an oscillator for producing a high frequency alternating test voltage for transmission to an electrode such as aforesaid, said oscillator including a current input line and also including a transformer having a secondary winding in which said high frequency test voltage is induced and a metering winding in which a control voltage is induced, a current flow control device in said current for rectifying said control voltage, and means for controlling the state of conduction of said current flow control device in response to changes in the peak value of the rectified voltage produced by said rectifying means, said means for controlling the state of conduction of said current flow control device in response to changes in the peak value of said rectified voltage comprising a circuit connected between the output of said rectifying means and ground and including a potentiometer having a resistor connected in series with said latter circuit and a Zener diode and resistor connected in series between said wiper and ground, a second current flow control device having a control terminal connected to the junction between said Zener diode and said latter resistor and also having two other terminals connected in another circuit, a resistor in said latter circuit having one terminal connected with one of said two other terminals of said second current flow control device, a capacitor connected between the other terminal of said latter resistor and the other of said two terminals of said second current flow control device, and means for controlling the state of conduction of said first-mentioned current flow control device in response to the voltage appearing at the junction of said latter resistor and capacitor.

11. A device as defined in claim 10 further characterized by said means for controlling the state of conduction of said first-mentioned current flow control device in response to the voltage appearing at the junction of said latter resistor and capacitor including at least one cathode follower stage connected between said latter junction and the control terminal of said first-mentioned flow control device.

12. A device for testing the insulation on an insulated conductor and for use with an electrode through which the conductor is passed with a continuous motion and adapted to apply a high test voltage to the portion of such insulation instantaneously received therein, said device comprising an oscillator for producing a high frequency alternating test voltage for transmission to an electrode such as aforesaid, said oscillator including a current input line and also including a transformer having a secondary winding in which said high frequency test voltage is induced and a metering winding in which a control voltage is induced, a current flow control device in said current input line for controlling the flow of current therethrough, means for rectifying said control voltage, means for controlling the state of conduction of said current flow control device in response to changes in the peak value of the rectified voltage producted by said rectifying means, a fault indicating means including a coil, and a circuit for controlling the energization of said coil in response to said load impedance related signal, said circuit including means for changing the energization of said coil from one state to another in response to a change in said signal indicating a large decrease in said load impedance, said means for producing a signal related to the load impedence including an impedance detecting circuit connected across two points of said primary winding, and said circuit for controlling the energization of said coil in response to said load impedance related signal further including a time-delay means for maintaining said coil in its second state of energization throughout a given delay period following said change in said signal indicating a large decrease in said load impedance.

13. A device as defined in claim 12 further characterized by said oscillator having an output frequency of greater than 600 Hz. and said delay period being equal to the time required for a number of cycles of said test voltage.

14. A device as defined in claim 12 further characterized by said oscillator having an output frequency of approximately 3000 Hz. and said delay period being equal to the time required for a number of cycles of said test voltage.

References Cited

UNITED STATES PATENTS

| | | | |
|---|---|---|---|
| 2,704,825 | 3/1955 | Martin et al. | 324—54 |
| 3,217,246 | 11/1965 | Kallet et al. | 324—54 |
| 3,252,086 | 5/1966 | Lundstrom | 324—61 |
| 3,256,495 | 6/1966 | Hunter | 331—117 XR |
| 3,284,724 | 11/1966 | Marlow | 331—117 XR |
| 3,339,136 | 8/1967 | Rasor et al. | 324—54 |
| 3,339,412 | 9/1967 | Maltby | 324—61 |

RUDOLPH V. ROLINEC, *Primary Examiner.*

GERALD R. STRECKER, *Assistant Examiner.*